No. 693,380. Patented Feb. 18, 1902.
C. DÉGRANGE.
VEHICLE WHEEL.
(Application filed June 26, 1899.)

(No Model.) 2 Sheets—Sheet 1.

Witnesses
Jean Germain
Guillaume Pioche

Inventor
Claude Dégrange

No. 693,380. Patented Feb. 18, 1902.
C. DÉGRANGE.
VEHICLE WHEEL.
(Application filed June 26, 1899.)

(No Model.) 2 Sheets—Sheet 2.

Witnesses
Jean Germain
Guillaume Tioche

Inventor
Claude Dégrange

UNITED STATES PATENT OFFICE.

CLAUDE DÉGRANGE, OF LYONS, FRANCE.

VEHICLE-WHEEL.

SPECIFICATION forming part of Letters Patent No. 693,380, dated February 18, 1902.

Application filed June 26, 1899. Serial No. 721,799. (No model.)

*To all whom it may concern:*

Be it known that I, CLAUDE DÉGRANGE, wheelwright, a citizen of the Republic of France, residing at 196 Cours de Villeurbanne, Lyons, in the Republic of France, have invented certain new and useful Improvements in Wheels for Vehicles, of which the following is a specification.

My invention relates to the assemblage of the spokes and the hubs in wooden wheels for vehicles of all kinds.

By far the greater number of accidents caused by the wheels of vehicles are occasioned by the rupture of the spokes where they join the hub—that is to say, the tenon of the spoke which assembles this latter with the hub usually breaks off flush with the hub. This rupture may also sometimes take place when the spoke is assembled with the rim.

The object of my invention is to obviate this defect by strengthening the spokes in proximity to that portion which enters the hub and also in proximity to the portion entering the rim by means of a metallic part or fitting. This part, which may be of various forms, is represented in the accompanying drawings in three different forms as regards the assemblage with the hub and in two different forms as regards assemblage with the rim.

Figure 1:
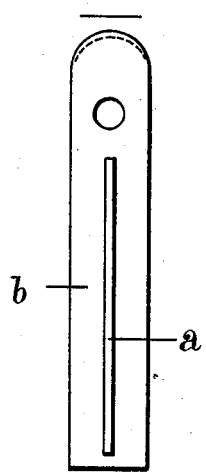
Figure 2:
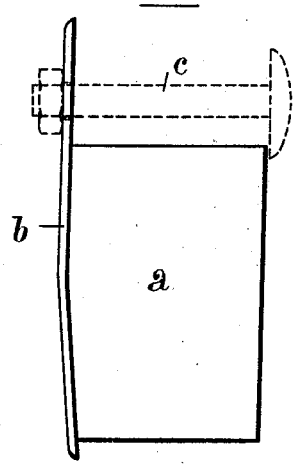
Figure 6:
Figure 4:
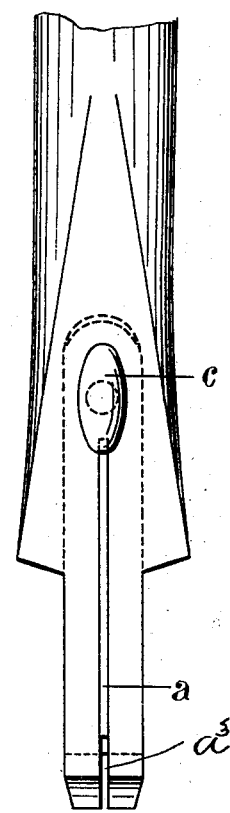
Figure 3:
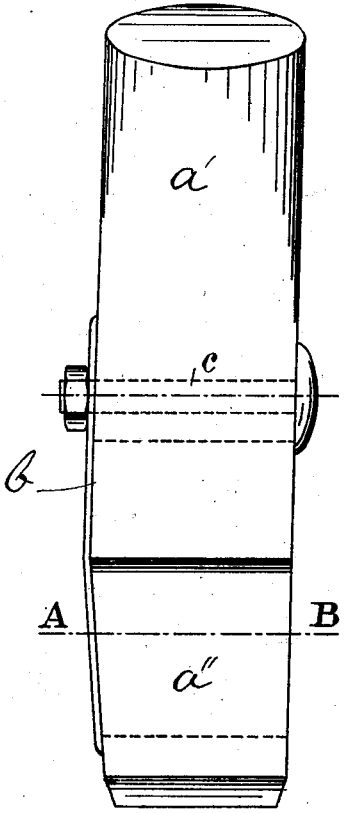
Figure 5:
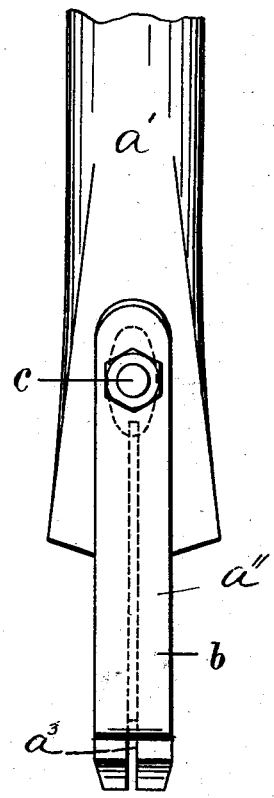
Figure 7:
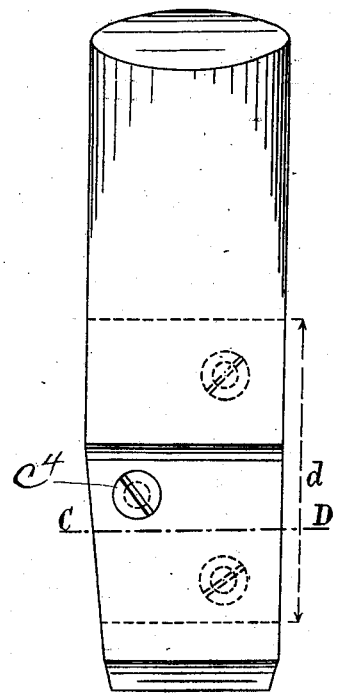
Figure 9:
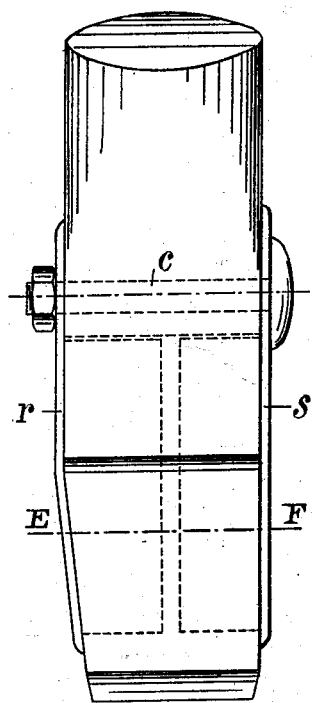
Figure 11:
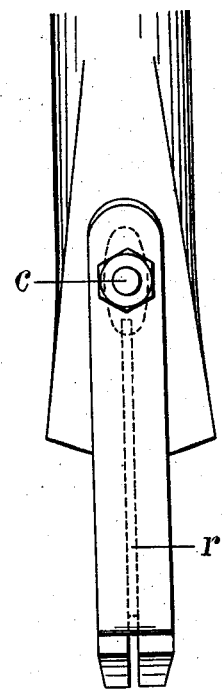
Figure 8:
Figure 10:

Figures 1 and 2 show in end and side elevation, respectively, one manner of carrying my invention into practice, the fitting being of sheet metal which has either been galvanized or not, or of any other metal of sufficient strength. Figs. 3, 4, and 5 represent in side elevation and in end elevation upon either side, respectively, a spoke strengthened by means of this reinforcing part. Fig. 6 is a section taken upon the line A B of Fig. 3. Figs. 7 and 8 represent, respectively in elevation and in horizontal section taken upon the line C D, a second form of reinforcing device which is equally adapted for use for the same purpose as the arrangement previously described. Figs. 9, 10, and 11 illustrate a third variety of my improved strengthening device, in front elevation in sectional plan, taken upon the line E F, and in end elevation, respectively.

In the arrangement represented in Figs. 1 to 6 the device is T-shaped, the large branch or web $a$ being of the same width as the spoke and of greater height than the tenon. The transverse portion or band-plate $b$ is of a width equal to the thickness of the tenon and of a height greater than that of the web $a$, so as to provide for the reception of a bolt or of screws $c$.

The spoke, Figs. 3 to 6, has a saw cut $a^3$ formed in the middle of its thickness, into which cut is inserted the web-plate $a$, while the band plate $b$ bears against the rear of the spoke—that is to say, upon that side of the spoke which will eventually be next to the body of the vehicle. The upper portion of this band is firmly connected with the spoke by means of the bolt $c$, the head of which bears at the same time upon the web-plate $a$. The spoke provided with this device is fitted into the hub (not shown) in the ordinary manner, the spoking maintains the device firmly fixed in the spokes, and the assemblage thus retains all the elasticity imparted by the pressure of wood against wood while acquiring considerable additional strength owing to the provision of the metal part. The head of the bolt $c$, which bears against the upper part of the web $a$, is advantageously made of elongated form, as represented in the drawings. The device may consist of two parts riveted together if sheet-steel is employed; but it may also be made in a single piece either forged or cast, according to the metal used. Its thickness will of course depend upon the strength required. The band-plate may be elongated behind or longitudinally of the spoke in order to fix it to the spokes by means of several bolts or screws, so that the device may be of greater or less height but always greater than the height of the tenon.

The second form of the device (shown in Figs. 7 and 8) consists merely of a reinforcement of the tenon of the spoke by means of a plate $d$ of sheet-steel or any other suitable metal, such plate being inserted within the tenon and preferably for its entire width. This plate should be of greater height than the tenon in order that it may extend within the spoke, and thus render the assemblage more rigid. It is fixed in position by means of rivets, screws, or bolts $c^4$, or the like, preferably arranged in an alternate manner or inserted alternately from opposite sides and staggered. This form of the device may be manufactured at a very low cost, but does not possess such strength as the form first described.

The third form of the device consists, as shown in Figs. 9 to 11, in effecting the strengthening by means of two distinct parts *r s*, having the form of a T-iron and which are arranged opposite one to the other upon the sides of the spoke, the counter plate or central web of each one of them being inserted in the thickness of the tenon and extending within the spoke for some little distance in order to impart strength to the assemblage. These two parts are rigidly connected together at their upper portion by means of the bolt or bolts *c* passing through their two band-plates and through the width of the spoke.

What I claim is—

1. As a new and useful article of manufacture, a spoke for a vehicle-wheel having a saw cut in one end, a web inserted in said saw cut and having a plate formed on or secured to the edge thereof and resting against the side of the spoke, the said plate and spoke being of equal thickness, whereby the edges of the plate will be flush with the edges of the spoke, and a bolt or screw securing said plate to the spoke, substantially as set forth.

2. As a new and useful article of manufacture a spoke for a vehicle-wheel having a tenon formed on one end thereof and said tenon being provided with a recess in its end extending longitudinally thereof, a reinforcing-web situated in said recess and extending into the spoke beyond the point of juncture between said tenon and the spoke proper, and a plate carried by the edge of said web and secured to the side of the spoke, the edges of said plate being flush with the edges of the tenon, substantially as set forth.

3. As a new and useful article of manufacture a spoke for vehicle-wheels having one end provided with a saw cut extending through both sides thereof, separate webs inserted in said saw cut from opposite sides of the spoke, a plate formed on the edge of each of said webs and having its edges flush with the edges of the spoke and means for clamping said plates and the spoke together, substantially as set forth.

4. A wheel having wooden-spoke sockets in combination with wooden spokes each provided in its end with a saw cut, a reinforcing-web inserted in said saw cut and extending outwardly beyond the point of juncture between the spoke and the socket, one edge of each of said webs being provided with a plate of not greater width than the thickness of the spoke, whereby the wooden part of the spoke will come in immediate contact with the wooden walls of the socket, and means for clamping said plate and web to the spoke, substantially as set forth.

In testimony whereof I have hereunto set my hand, in presence of two subscribing witnesses, this 8th day of June, 1899.

CLAUDE DÉGRANGE.

Witnesses:
   THOS. N. BROUNE,
   JEAN GERMAIN.